(12) United States Patent
Bland et al.

(10) Patent No.: US 8,918,124 B2
(45) Date of Patent: *Dec. 23, 2014

(54) COMMUNICATIONS PLATFORM

(76) Inventors: Kenneth Bland, Edison, NJ (US); Darrell McDowell, Spokane, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/919,231

(22) PCT Filed: Mar. 22, 2010

(86) PCT No.: PCT/US2010/028169
§ 371 (c)(1),
(2), (4) Date: Aug. 25, 2010

(87) PCT Pub. No.: WO2010/108184
PCT Pub. Date: Sep. 23, 2010

(65) Prior Publication Data
US 2011/0045802 A1 Feb. 24, 2011

Related U.S. Application Data

(60) Provisional application No. 61/161,949, filed on Mar. 20, 2009, provisional application No. 61/302,233, filed on Feb. 8, 2010.

(51) Int. Cl.
*H04W 36/00* (2009.01)
*H04W 36/38* (2009.01)
*H04W 76/04* (2009.01)
*H04W 76/00* (2009.01)
*H04W 76/02* (2009.01)

(52) U.S. Cl.
CPC .......... *H04W 36/385* (2013.01); *H04W 76/04* (2013.01); *H04W 76/007* (2013.01); *H04W 76/02* (2013.01)

USPC .................. 455/466; 455/404.2; 455/414.1; 455/404.1; 455/566

(58) Field of Classification Search
CPC ....... H04W 4/02; H04W 4/22; H04W 72/005; H04W 76/007; H04W 36/385; H04W 40/24
USPC ............. 455/403, 404.1, 404.2, 414.1, 414.2, 455/466, 566; 340/539.13, 825.49, 573.14, 340/286.06, 286.02, 286.01, 287
See application file for complete search history.

(56) References Cited

U.S. PATENT DOCUMENTS

| | | | |
|---|---|---|---|
| 6,963,948 B1 * | 11/2005 | Gulick ........................ | 710/311 |
| 7,574,208 B2 * | 8/2009 | Hanson et al. ............. | 455/435.1 |
| 7,580,884 B2 * | 8/2009 | Cook ............................ | 705/38 |
| 2002/0145045 A1 * | 10/2002 | Waxelbaum ............. | 235/462.46 |
| 2005/0151641 A1 * | 7/2005 | Ulrich et al. ............. | 340/539.13 |
| 2006/0167972 A1 * | 7/2006 | Zombek et al. ............ | 709/202 |
| 2006/0282312 A1 * | 12/2006 | Carlson et al. ............ | 705/14 |
| 2007/0061222 A1 * | 3/2007 | Allocca et al. ............ | 705/26 |
| 2008/0117075 A1 * | 5/2008 | Seddigh et al. .......... | 340/825.36 |
| 2013/0212195 A1 * | 8/2013 | Bonefas et al. ............ | 709/206 |

* cited by examiner

*Primary Examiner* — Jean Gelin
(74) *Attorney, Agent, or Firm* — Ernest D. Buff; Ernest D. Buff & Assoc. LLC; Margaret A. Lacroix

(57) ABSTRACT

A communications platform for mobile devices for transmitting data (such as alert messages) to at least one mobile device user comprises a server and an alert client, which client may be responsible for receiving alert messages sent by the server and may further perform specific functions on a mobile communications device to insure that the alert message does not remain unnoticed or ignored. The platform may further comprise a cell broadcast service server to limit transmission of an alert message to mobile device users in a particular locality or localities.

7 Claims, 4 Drawing Sheets

COMMUNICATIONS PLATFORM

CROSS-REFERENCE TO RELATED APPLICATIONS

The present application claims priority under 35 United States Code, Section 119 on the U.S. Provisional Patent Application No. 61/302,233, filed on Feb. 8, 2010 and the U.S. Provisional Patent Application No. 61/161,949, filed on Mar. 20, 2009, the disclosures of which are incorporated by reference.

FIELD OF THE DISCLOSURE

The present disclosure generally relates to distribution and transmission of data to users and clients generally relates to distribution and transmission of data to users and clients, and more particularly, distribution and transmission of data by way of a communications platform that is not dependent upon a data carriers network or transmission facilities.

MOTIVATION FOR THE DISCLOSURE

Mobile communication devices and networks facilitate users in sending and receiving data to fellow users of such devices. However, limitations inherent with such devices and networks preclude efficient and widespread distribution of data. Thus, a user may not be able to send a message to a friend or colleague due to the inability of the friend or colleague's device to receive a certain message form, or due a network's restriction on data transmission.

Further, due to network traffic limitations as well as the limitations of a device in receiving only a certain type or form of message, urgent communications may be delayed in transmission or otherwise may not reach a user.

Similarly, data access for mobile devices may be constrained by a mobile device's service carrier such that access is dependent on a carrier's geographical service coverage and particular data plan service and pricing. Also, data access is limited to mobile devices that subscribe to data plans or feature Wireless Application Protocol ("WAP") browsers. Such data plan and WAP browser configurations exclude mobile devices that are only capable of sending and receiving text messages (i.e., have SMS browsers) and otherwise do not support multimedia data transfer from accessing the Internet and from receiving data thereon.

Short Messaging Service (SMS) and Multimedia Message Service (MMS) technologies are examples of widely-used communication methods for mobile telephone users. These services are inexpensive, reliable, and are compatible with virtually all carrier networks and mobile handsets. The versatile nature of the technologies not only makes it useful for conventional communication usage, but can also serve other vital purposes; including the mass transmission of messages (i.e., to a plurality of mobile handset users).

SMS and MMS have has certain drawbacks, however. For example, transmission and receipt of an SMS or MMS message is dependent on a mobile carrier's network capacity. That is, in times of heavy network usage, a message may not be delivered in a timely fashion. Furthermore, delivery of a SMS or MMS message to a handset is usually to a particular folder in the handset's file storage system, such that a message recipient user must navigate a plurality of steps and screens to view the contents of the message. Due to such a cumbersome retrieval scheme, a recipient's viewing of an important message may be delayed.

Also, in the event that a user's carrier service subscription does not include a messaging plan, receipt of such messages for such a user may invoke additional costs to the user's service bill. In such a case, a user may be reluctant to retrieve or view such messages due to the additional associated costs.

Accordingly, there persists a need for communicating data to the multitude of mobile device users, regardless of the users' devices or network subscriptions.

Therefore, it is an object of the present disclosure to obviate the disadvantages from existing art and to provide for distribution and transmission of data by way of a independent communications platform that is not dependent upon a data carrier's network or transmission facilities, and is not dependent upon a mobile device user's data plan or subscription.

It is further an object to provide for prioritization of transmission of particular data to users, such as data events involving weather and other emergencies. It is yet another object to provide for the directed transmission of data to users based on the particular location of users. It is moreover an object of the present disclosure to permit prioritization of transmission of various data packets based upon a criterion or criteria, and yet another object of the disclosure to provide an automated message receipt confirmation.

DESCRIPTION OF THE DRAWINGS

The advantages and features of the present disclosure will become better understood with reference to the detailed description taken in conjunction with the accompanying drawings, wherein like elements are identified with like symbols, and in which.

Like reference numerals refer to like parts throughout the description of several views of the drawings.

DETAILED DESCRIPTION OF THE DISCLOSURE

Figure 1:
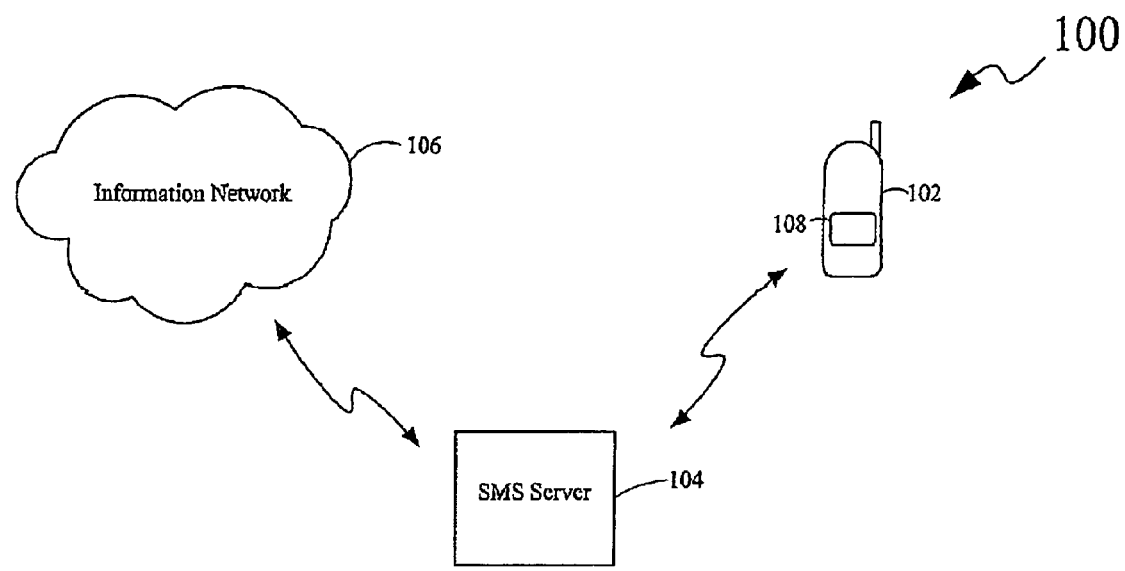
FIG. 1 illustrates an environment in which various embodiments of the present disclosure may be practiced.

The best mode for carrying out the present disclosure is presented in terms of the embodiment, herein depicted in FIGS. 1 through 4. The embodiment described herein detail for illustrative purposes and is subject to many variations. It is understood that various omissions and substitutions of equivalents are contemplated as circumstances may suggest or render expedient, but are intended to cover the application or implementation without departing from the spirit or scope of the present disclosure. Further, it is to be understood that the phraseology and terminology employed herein are for the purpose of the description and should not be regarded as limiting. Any heading utilized within description are for convenience only and have no legal or limiting effect.

The terms "a" and "an" herein do not denote a limitation of quantity, but rather denote the presence of at least one of the referenced item.

The present disclosure provides a communications platform for a network and mobile devices for transmitting data over at least one network and/or to or between users of mobile devices and for receiving data from a server or a user for redistribution over at least one network or to other users.

The communication platform disclosed herein permits a user to interact with a multi-page application. In an embodiment, a web application server comprising Javaserver pages associated with a user (such as an individual, a government entity or a service provider) may receive a request from a user to generate a data transmission. On receipt of the request, the web application server may accordingly process the request and retrieve a page from the Javaserver pageflow. The user may then enter data in a query form on the page and submit it to the web application server. The server may then process the query form to generate a message in a page format. The user may request that the server distribute the generated message to one or more individual or categorized users that meet a criterion or criteria. It will be understood that the server is capable of communicating with users may reside on the same network as a mobile device of a user.

The present disclosure further provides a communications platform for mobile devices for transmitting data (such as alert messages) to at least one mobile device user. In an embodiment, the communications platform comprises an alert server and an alert client. The alert server may be responsible for managing mobile device user profiles, alert campaign administration, alert messages encryption, and delivery of alert messages. The alert client may be an application that resides on a user's mobile device. The client may be responsible for receiving alert messages sent by the alert server and may further perform specific functions on the mobile handset to insure that the alert message does not remain unnoticed or ignored.

In an embodiment, the alert server may include a software application that allows an administrator to manage or perform tasks associated with the communications platform, such as, but not limited to, alert campaign management, integration and updating of mobile device user databases, and the like. In an embodiment, the server includes at least one end-user database, such as a routing database system (RDBS) or a lightweight directory access protocol (LDAP) user profile repository. Any number of databases can be integrated with the alert server such that the alert server may access such databases to define a list of recipients (i.e., mobile device users) for a creation of an alert message campaign.

The alert server can send alert messages in mass quantities and permits an administrator to create future-date alert campaigns (for example, for transmission of alert messages on a predetermined future time, as opposed to on an as-needed basis.) A future-alert campaign can also be set to repeat itself on a specific date and time. The server may be capable of encrypting outbound alert messages via cryptographic protocols such as RSA® and elliptical curve cryptography. It will be understood that the alert client of the communications platform will be configured to decrypt any encrypted messages generated by the alert server In an embodiment of the present disclosure, the alert client of the communications platform comprises a plug-in or application that is installed on a user's mobile device. In an embodiment, the client is a J2ME-based mobile application. It will be understood that the client application may also be Symbian-based, for example, or any other language that is compatible with mobile phone operating system software. In another embodiment, the alert client comprises a plurality of applications, such as first application that is capable of recognizing an incoming cellular broadcast transmission and is further capable of opening a channel on a mobile device for receiving the transmission, and a second application that operatively communicates with the first application to receive and convert the transmission for display to a user on his or her mobile device.

The alert client application(s) may be installed via over-the-air methods to a user's mobile device for ease and convenience in installation. The client may run as a background process on the mobile device such that a user is not required to activate it prior to being able to receive alert messages from a server of the communications platform.

In an embodiment, the client is configured to receive an alert message that may be generated by the server (or may be uploaded to the server by a third party) and transmitted by the server. Upon receipt of an alert message, the client will notify the device user of the message. In an embodiment, upon receipt of a message, the client will activate the mobile device's "vibrate" function, activate a distinct ringtone that may be included upon and installation of the client, and open a full-screen popup message on the device's display screen, which message will include the contents of the alert message generated and/or transmitted by the server. The pop-up message will replace any image that was on the display screen prior to receipt of the alert message. In an embodiment, the ringtone (for example, a siren tone) activated by the client may sound continuously until the user deactivates the ringtone. The user will be able to return to the display screen's previous image by manipulation of his or her mobile device's display controls. Upon such action by the user, the client will transmit a return message to the server that indicates that the user has received the alert message.

FIG. 1 illustrates an exemplary embodiment of an environment 100 in which various embodiments of the present disclosure may be practiced. The environment 100 includes a mobile device 102, an SMS Internet proxy server 104 (hereinafter referred to as 'SMS server 104'), and an information network 106. Examples of the mobile device 102 may include a mobile phone, a Personal Digital Assistant (PDA) and the like. It will be evident to those skilled in the art that the information network 106 may be a network, such as the Internet, including a plurality of computing devices in a plurality of locations and capable of communicating with each other. The mobile device 102 is capable of communicating using SMS as a transport layer with the SMS server 104 over at least one of a wireless network and a wired network. The SMS server 104 is similarly capable of communicating with the information network 106 (and, in an embodiment, a web application server residing thereon) over at least one of the wireless network and the wired network. Examples of the wireless network may include a cellular network, a Wireless Local Area Network (WLAN) and the like. Examples of the wired network may include, but are not limited to, Ethernet, Local Area Network (LAN) and the like.

In another embodiment, the environment 100 includes a cell broadcast service (CBS) (not shown), and the mobile device 102 is capable of communicating using cell broadcast (CB) as a transport layer. In this embodiment, a server 104a and mobile device 102 will be coupled with the cell broadcast service. In such an embodiment, the server will generate and transmit an alert message to at least one cell broadcast entity (CBE) of the CBS. The CBE may then transmit the message to a Cell Broadcast Center (CBC) of the CBS for delivery of the message. The CBC may forward the message to at least one Base Station Controller (BSC) in a mobile network. It will be apparent that each BSC of a mobile network will control at least one mobile data transmission tower.

Upon receipt by the at least one BSC of an alert message, the at least one BSC will forward the message to one or more of the mobile towers associated with the BSC. The tower or towers receiving the alert message from a BSC may then broadcast the alert message on one or more of the dedicated frequencies, and mobile devices 102 configured with the client of the present disclosure will receive the message. In such an embodiment, transmission of an alert message may be limited to mobile device users situated in a distinct and specified geographical area.

The mobile device 102 preferably includes a browser 108 capable of displaying data, such as data in the form of an SMS message or cell broadcast message, a WAP application, an Instant Message, electronic mail, and Limited HTML Device integration. Though the mobile device 102 as shown in FIG. 1 is depicted to include only the browser 108, it will be evident to those skilled in the art that the mobile device 102 may include components such as a processor, a number key pad, a display screen, and the like for performing regular functions of the mobile device 102.

In an embodiment, the SMS server 104 receives the request SMS message from a client or a user for generation of a data transmission and sends a generation request to the information network 106. The request may be sent using any of a Hypertext Transfer Protocol (HTTP), a Simple Mail Transfer Protocol (SMTP), a Real-time Transport Protocol (RTP), a Domain Name System (DNS), and the like. The SMS server 104 is further capable of receiving a response in the form of a data transmission generated by the information network from the information network 106. The response may be sent using any of a Hypertext Transfer Protocol (HTTP), a Simple Mail Transfer Protocol (SMTP), a Real-time Transport Protocol (RTP), a Domain Name System (DNS), and the like. For instance, if the SMS server 104 sends an HTTP request for the target URL to the information network 106, then the information network 106 sends an HTTP response for the HTTP request to the SMS server 104.

The SMS server 104 sends the response received from the information network 106 to the browser 108 in the form of at least one response SMS messages. The browser 108 receives the response using SMS as the transport layer and processes the at least one response SMS messages to generate the data transmission. The browser 108 is capable of providing the data transmission to a user interface (not shown) provided on the mobile device 102 for display purposes. The browser 108 and components thereof are explained in detail in conjunction with FIG. 2. In another embodiment, the server, operatively coupled with a cell broadcast entity, may send a message to a browser 108 of a mobile device 102 by way of cell broadcast as the transport layer.

In an embodiment, a user may request the data transmission, and the network may send the generated transmission to at least one user. In this embodiment the requesting user may request the generation of a message that is to be generated and transmitted to at least one user based upon at least one criterion associated with the at least one user that is to receive the transmission. In such an embodiment, the information network is capable of receiving at least one criterion in connection with data generation request. The information network will include a processing module that is capable of transmitting a generated response to only a distinct user or group of users that meet the criterion or criteria specified in a data generation request. In this embodiment, a user may request that an emergency message be generated and transmitted to a group of users that fall within a specified geographic criterion, for example.

Figure 2:
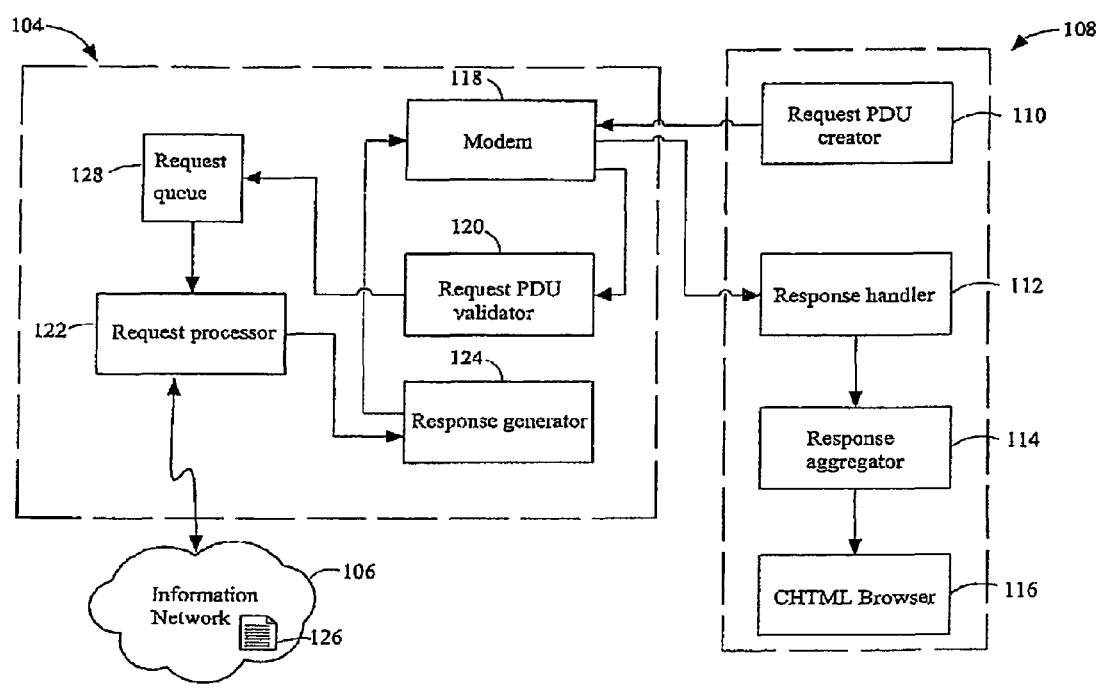
FIG. 2 illustrates a block diagram of an independent communications platform for providing transmission of data access across an information network, in accordance with an embodiment of the present disclosure.

FIG. 2 illustrates a block diagram of the browser 108 for receiving and displaying a data transmission providing access to the information network 106 to the user of the mobile device 102 in accordance with an embodiment of the present disclosure. The browser 108 includes a request Protocol Data Units (PDU) creator 110 (hereinafter referred to as 'request PDU creator 110'), a response handler 112, a response aggregator 114 and a browser 116. The SMS server 104 includes a modem 118, a request PDU validator 120, a request processor 122 and a response generator 124. It will be apparent to one skilled in the art that the server will include the requisite components to facilitate communication with a cell broadcast entity.

A browser 108 of a first device 102 (not shown) generates a data transmission such as a media message 126. The request PDU creator 110 receives media 126 and generates a request PDU associated with the media. A PDU such as the request PDU includes control information, (optionally) a network address and data associated with the media. The mobile browser 108 sends the request PDU in form of a request SMS message to the SMS server 104. In an embodiment of the present disclosure, the request PDU creator 110 creates a plurality of request PDUs associated with a data transmission input by the client or user of the first mobile device 102. Accordingly, the mobile browser 108 sends the plurality of request PDUs in the plurality of request SMS messages to the SMS server 104. The request SMS message or the plurality of request SMS messages is received by the SMS server 104 using the modem 118. An example of the modem 118 is a Global System for Mobile Communications (GSM) modem. However, it may be apparent to a person skilled in the art that any other types of modems that are capable of establishing a communication link between the SMS server 104 and the mobile browser 108 for sending and receiving SMS messages may be configured in the SMS server 104, or between a server associated with a CBE and a mobile browser for sending and receiving cell broadcasts configured in the server.

The data transmission of the first device 102 received by the modem 118 is sent to the request PDU validator 120. The request PDU validator 120 validates the request SMS message to identify the data transmission generated by a client or user of the first mobile device 102. More specifically, the request PDU validator 120 reads the request PDU present in the data transmission to identify the data transmission, and, optionally, any criteria and or/distribution lists or instructions contained therein. The request PDU validator 120 thereafter places the data transmission of the first device 102 in a request queue 128. The request queue 128 may include a plurality of data transmissions received from a plurality of mobile devices, such as the mobile device 102, communicably connected with the SMS server 104.

The data transmission present in the request queue 128 is received by the request processor 122 based on, for example, an order of the plurality of data transmissions in the request queue 128. In another embodiment, the request queue may reorder data transmissions for processing based on characteristics of the transmissions, such as, for example, keywords in a transmission, the user that generated a transmission, or other identifying characteristics. The request processor 122 is capable of sending a message generation request based on the data transmission to the information network 106 for obtaining a media message 126 for distribution to a browser 108 of at least a second mobile device 102 (not shown). In an embodiment of the present disclosure, the message generation request for the message may be sent using an HTTP protocol to the information network 106. Thus, the request send to the information network 106 may be an HTTP request. It may be apparent to a person skilled in the art that the request processor 122 may employ other protocols known in the art such as a Simple Mail Transfer Protocol (SMTP), a Real-time Transport Protocol (RTP), a Domain Name System (DNS) and the like, for sending the URL request associated with the target URL to the information network 106. In an embodiment of the present disclosure, the request processor 122 may include a module to initiate the URL request to the information network 106.

The information network 106 provides a response for the request, i.e. the message generation request received from the request processor 122. In an embodiment of the present disclosure, the information network 106 sends an HTTP response for the HTTP request received from the request processor 122. The response may include contents of the media message 126 requested by a client or user of the first mobile device 102. The request processor 122 receives the response and sends the response to the response generator 124. The response generator 124 converts the response into multiple response SMS messages. More particularly, each response SMS message of the multiple response SMS message may include a part of the contents of the media message 126. In an embodiment of the present disclosure, the response generator 124 creates an SMS response beam (hereinafter referred to as 'response beam') using the multiple response SMS messages associated with the message 126. It will be apparent to a person skilled in the art that the response generator 124 is configured to generate a plurality of response beams for media message requested by the user of the mobile device 102.

In another embodiment, the response generator 124 converts the response into one or more CB transmissions.

The response generator 124 sends the response beam, e.g., at least one response SMS message or at least one response CB transmission, to at least one of the first and second (and, optionally, additional mobile devices) mobile device 102 through the modem 118. More specifically, the modem 118 transmits each response SMS message of the response beam to the browser 108. The response handler 112 receives the each response SMS message or response CB transmission and sends the response beam to the response aggregator 114. In the event of a plurality of messages, the response aggregator 114 aggregates or merges the contents included in the multiple response SMS messages or multiple CB transmissions. In an embodiment of the present disclosure, the response aggregator 114 may be further configured to arrange the multiple response SMS messages or multiple response CB transmissions within the response beam. Subsequently, the response aggregator 114 concatenates the multiple response SMS messages into a single response SMS message, or the multiple response CB transmissions, into a single CB response message (hereinafter referred to as "response message").

More particularly, the response aggregator 114 combines the contents of the plurality of messages to form the response message. The response aggregator 114 sends the response message to the browser 116 for displaying the content present in the response message to the user. In an embodiment of the present disclosure, the response aggregator 114 may generate the response message in a (Hyper Text Markup Language) HTML format, i.e., a HTML message. The HTML message may be send to the browser 116 such as a HTML browser to generate an HTML page containing the contents present in the HTML message. The HTML page may be displayed as a media message 126 to the user through a display screen of the mobile device 102. It will be apparent to a person skilled in the art that the response aggregator 114 may generate the response message in the form of any other format known in the art such as an XHTML format, an WML format, an SMS format and the like and send the response message to any browsers known in the art such as a XHTML browser, a WML browser, an SMS browser and the like, to generate the data transmission to be displayed to the user. In an embodiment, the response message or data transmission may include a command that activates a mobile device's message receipt signal (such as a ringtone or a vibrate function).

It will be evident to those skilled in the art that each components of the mobile device 102 such as the request PDU creator 110, the response handler 112, the response aggregator 114 and the browser 116; and each component of the SMS server 104 such as the request PDU validator 120, the request processor 122 and the response generator 124 may be implemented as a hardware module, a software module, a firmware module, or any combination thereof. Furthermore, it will be obvious to those skilled in the art that the browser 108 and the SMS server 104 may include requisite electrical connections or other connections for communicably coupling the various components of the browser 108 and the SMS server 104, respectively.

Figure 3:
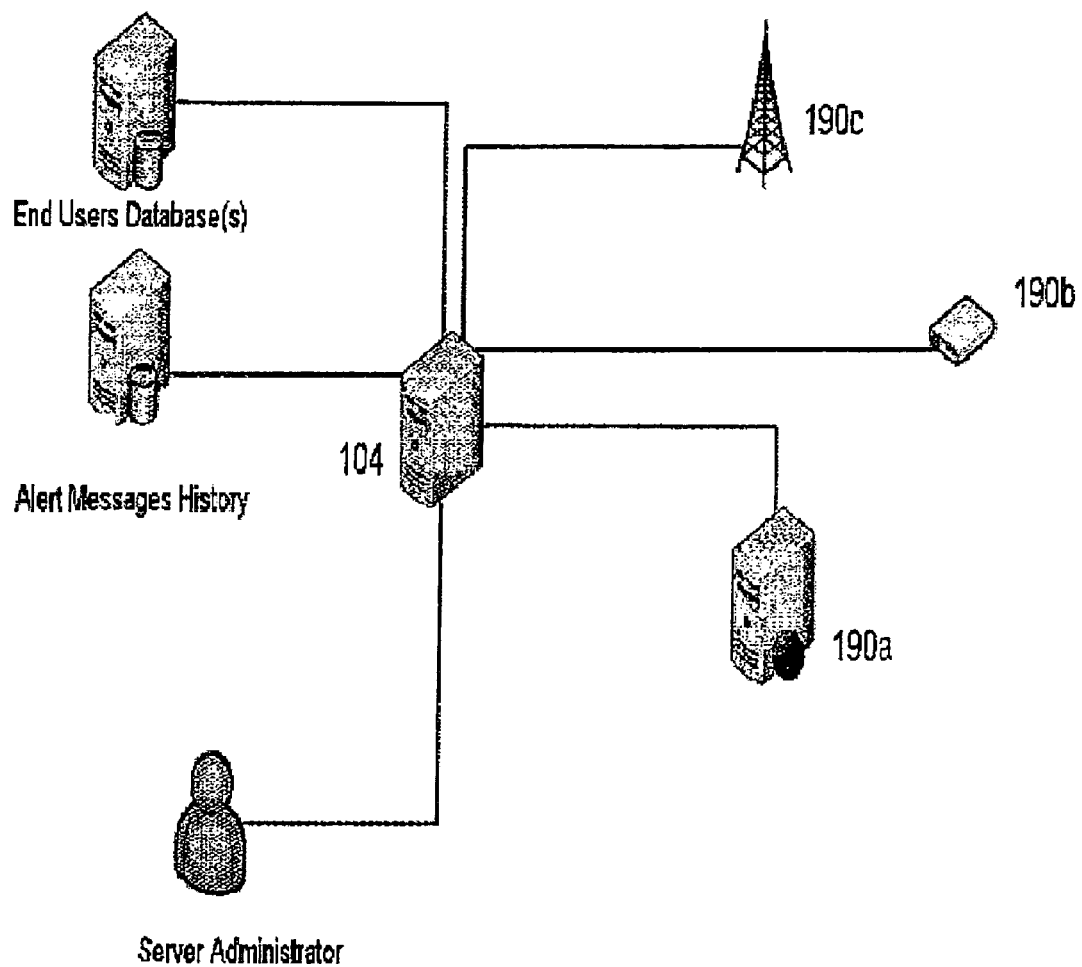
FIG. 3 illustrates a non-limiting depiction of an alert communications platform, in accordance with an exemplary embodiment of the present disclosure.

Referring now to FIG. 3, in another embodiment, a communications platform for transmittal of messages is provided. In such an embodiment, for transmittal of an alert message from an alert server 104 to a user, the server may utilize one or more SMS gateways 190. Further, the SMS gateways may be web-based 190a, a Global System for Mobile Communications (GSM) modem gateway 190b, or a Short Message Service Center gateway 190c. Moreover, the server may relay alert messages through a plurality of protocols such as short message peer-to-peer (SMPP), for instance, to a Short Message Service Center gateway 190c, AT commands, for instance, to a GSM model gateway 190b, hypertext transfer protocol (HTTP), simple object access protocol (SOAP), for instance, to a web-based SMS gateway 190a, or any other protocol supported by one or more of the SMS gateways 190.

Figure 4:
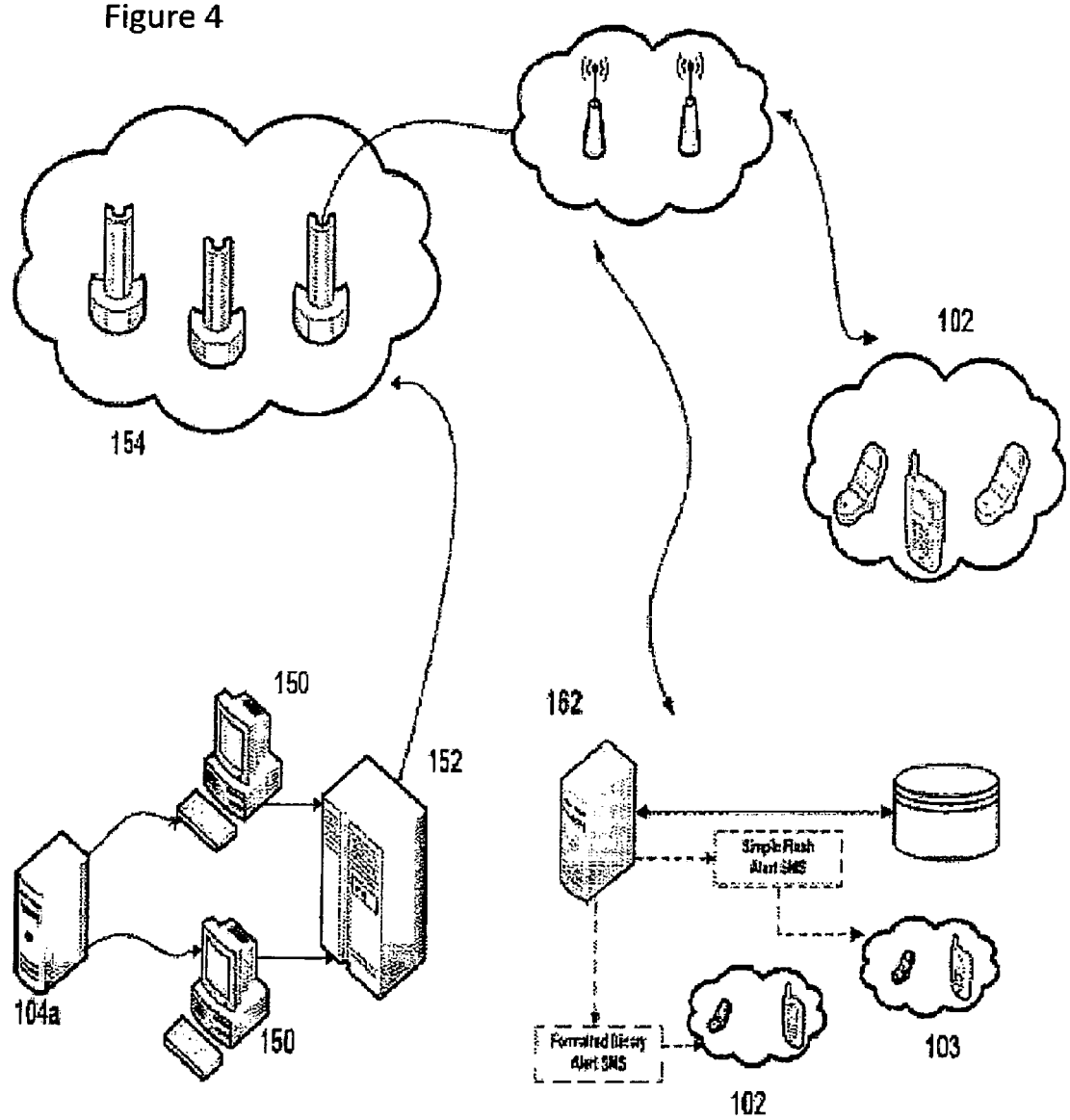
FIG. 4 illustrates a non-limiting depiction of an alert communications platform, in accordance with another exemplary embodiment of the present disclosure.

In another embodiment, referring now to FIG. 4, transmittal of a message, such as an alert message, from the server to the alert client may occur via a dedicated emergency frequency or set of frequencies, such as a frequency located in the 800 MHz band. In such an embodiment, the client further comprises a scanner that will search for messages transmitted by the server on the dedicated frequency or frequencies. In this embodiment, the server 104a and client will be coupled with a cell broadcast service (CBS). In such an embodiment, the server 104a will generate and transmit a message such as an alert message to at least one cell broadcast entity 150 (CBE) of the CBS. The CBE 150 may then transmit the message to a Cell Broadcast Center 152 (CBC) of the CBS for delivery of the message. The CBC 152 may forward the message to at least one Base Station Controller 154 (BSC) in a mobile network. It will be apparent that each BSC 154 of a mobile network will control at least one mobile data transmission tower.

Upon receipt by the at least one BSC 154 of an alert message, the at least one BSC will forward the message to one or more of the mobile towers 156 associated with the BSC. The tower or towers 156 receiving the alert message from a BSC 154 may then broadcast the alert message on one or more of the dedicated frequencies. Mobile devices 102 configured with the client of the present disclosure will receive the message, and the alert message will display on the receiving mobile device as described in conjunction with FIG. 3.

It will be understood that the server may, through the CBS, direct transmission of an alert message to mobile data transmission towers in a particular locality or localities, so as to transmit an alert message only to mobile device users in a particular locality or localities. In such an embodiment, the communications platform disclosed herein manages the resources of a mobile carrier's network or other communications network by limiting the transmission of messages and distribution of data to a distinct group of recipients, and limits the consumption of network capacity by preventing the sending of messages to unintended recipients.

In yet another embodiment, referring again to FIG. 4, an alert communications platform further comprises a mediation server 162, which server may receive alert messages transmitted over the CBS. The mediation server may be coupled with a database 164 similar to the database or databases described above in connection with the alert server of the communications platform. The database or databases 164 may include identification of a plurality of mobile device users, as well as an indication of whether a user of the plurality of users has installed the client on his or her mobile device. Based on this indication, the mediation server may format an alert message received from the alert server for transmission to a particular user or users. In the event that a user's mobile device 52 is not configured with the client of the communications platform, the mediation server may convert an alert message to an SMS or MMS format before transmitting the message on to such a user so that the user can receive the alert and view the contents of the alert. In the event that a user's mobile device 102 is configured with the alert client, the mediation server 164 may transmit the alert message without any such conversion.

In use, the communications platform described herein enables transmission and receipt of data that is independent of access provided by a mobile device's service carrier or pursuant to a carrier's data plan. A user of the platform may request generation of a data transmission with particular content and obviate dependence on a transmission or data format that is offered by a user's carrier. Furthermore, the disclosure enables mobile devices that do not include WAP browser or are not capable of sending and receiving multimedia messages to still access data in a variety of formats. Moreover, in the instance of transmission of data by way of a CBE, the system allows data to be targeted towards and received by mobile device users in a specified and/or limited geographical area or areas.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated.

What is claimed is:

1. A communications platform, the communications platform comprising at least one server, a transport layer, a client, and at least one mobile communications device,
   wherein the client comprises at least one application operatively coupled to the at least one mobile communications device, the client capable of communicating with the at least one server of the platform over the transport layer, the client further capable of receiving a transmission from the at least one server over the transport layer, the client further capable of displaying said transmission on the at least one mobile communications device upon direction from the at least one server, and the client further capable of transmitting a return message communicating to the at least one server that a transmission has been displayed on the at least one mobile device, wherein the communications platform is not dependent upon a data carrier's network or carrier's transmission facility, thereby providing an independent communication platform for distribution and transmission of data, and wherein the transmission is adapted for direct distribution to one or more individual or categorized users that meet a criterion or criteria.

2. The communications platform of claim 1, wherein the at least one server comprises a short message service internet proxy server.

3. The communications platform of claim 1, wherein the transport layer comprises short message service.

4. The communications platform of claim 1, wherein the transport layer comprises cell broadcast service.

5. The communications platform of claim 1, wherein the at least one server further comprises a mediation server, which mediation server may convert or reformat a transmission for display on a mobile communications device on which the client is not operatively coupled.

6. The communications platform of claim 1, wherein at least one mobile communications device comprises a browser capable of communicating with and displaying a transmission received from the at least one server.

7. The communications platform of claim 1, wherein the client is adapted to permit a user to interact with a multi-page application associated with the user, wherein the client is capable of receiving a request from the user to generate a data transmission, on receipt of the request the client processes the request and retrieves a page from the application so that the user may then enter data in a query form on the page and submit it to the server, the server is capable of processing the query form to generate a message in a page format, wherein the user is capable of requesting that the server distribute the generated message to one or more individual or categorized users that meet a criterion or criteria.

* * * * *